US009893556B2

(12) United States Patent
Iwasaki et al.

(10) Patent No.: US 9,893,556 B2
(45) Date of Patent: Feb. 13, 2018

(54) POWER RECEIVING CIRCUIT, CONTROL METHOD FOR WIRELESS POWER RECEIVING APPARATUS, AND ELECTRONIC DEVICE

(71) Applicant: ROHM CO., LTD., Ukyo-Ku, Kyoto (JP)

(72) Inventors: Tatsuya Iwasaki, Kyoto (JP); Kazuyoshi Yasuoka, Kyoto (JP); Naoki Inoue, Kyoto (JP); Daisuke Uchimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 257 days.

(21) Appl. No.: 14/687,130

(22) Filed: Apr. 15, 2015

(65) Prior Publication Data

US 2015/0222144 A1 Aug. 6, 2015

Related U.S. Application Data

(63) Continuation of application No. PCT/JP2013/006057, filed on Oct. 10, 2013.

(30) Foreign Application Priority Data

Oct. 16, 2012 (JP) .................................. 2012-229112

(51) Int. Cl.
*H01M 10/44* (2006.01)
*H01M 10/46* (2006.01)
(Continued)

(52) U.S. Cl.
CPC .............. *H02J 7/025* (2013.01); *H02J 5/005* (2013.01); *H02J 7/007* (2013.01); *H02J 7/0052* (2013.01); *H02J 7/041* (2013.01); *H02J 7/045* (2013.01)

(58) Field of Classification Search
CPC ........... H02J 7/025; H02J 7/0045; H02J 5/005
(Continued)

(56) References Cited

U.S. PATENT DOCUMENTS

| 2009/0085527 | A1 | 4/2009 | Odaohhara |
| 2013/0057208 | A1 | 3/2013 | Takada et al. |
| 2013/0162200 | A1* | 6/2013 | Terry ...................... H02J 5/005 320/108 |

FOREIGN PATENT DOCUMENTS

| CN | 101233666 A | 7/2008 |
| CN | 102157989 A | 8/2011 |

(Continued)

OTHER PUBLICATIONS

Japanese Notification of Reasons for Refusal corresponding to Application No. 2012-229112; dated Nov. 29, 2016, with English translation.

(Continued)

*Primary Examiner* — Edward Tso
(74) *Attorney, Agent, or Firm* — Cantor Colburn LLP (57) ABSTRACT

A power receiving control circuit is provided that receives AC coil current $I_{RX}$ from a reception coil and that supplies DC output voltage $V_{OUT}$. A rectifier circuit rectifies the coil current $I_{RX}$. A linear regulator receives a rectified voltage $V_{RECT}$ across a smoothing capacitor, and generates the output voltage $V_{OUT}$ stabilized to a predetermined target level. A controller has predetermined control characteristics configured as a relation between the value of a charging current $I_{CHG}$ and the target value of the rectified voltage $V_{RECT}$. The controller detects the value of the charging current $I_{CHG}$, and transmits information which indicates electric power to be transmitted from a wireless power supply apparatus, with reference to the control characteristics. The controller is configured to be capable of changing the control characteristics.

19 Claims, 6 Drawing Sheets

(51) Int. Cl.
*H02J 7/02* (2016.01)
*H02J 5/00* (2016.01)
*H02J 7/04* (2006.01)
*H02J 7/00* (2006.01)

(58) Field of Classification Search
USPC .................................................. 320/108, 140
See application file for complete search history.

(56) References Cited

FOREIGN PATENT DOCUMENTS

| | | | |
|---|---|---|---|
| JP | 2005245078 A | 9/2005 | |
| JP | 2008173003 A | 7/2008 | |
| JP | 2009219221 A | 9/2009 | |
| JP | 2010028935 A | 2/2010 | |
| JP | 2011244530 A | 12/2011 | |
| JP | 2012055109 A | 3/2012 | |
| JP | 2012110085 A | 6/2012 | |
| TW | 200915699 A | 4/2009 | |
| WO | 2007015599 A1 | 2/2007 | |
| WO | 2010035545 A1 | 4/2010 | |

OTHER PUBLICATIONS

"The Power Supply Circuits, and 57V Variable Power Supply Circuit", www.powersupply33.com (May 10, 2012).
KIPO, Notification of Reason for Refusal issued for corresponding Korean Patent Application No. 10-2014-7032260; dated Jul. 19, 2016, with English translation.
Chinese First Office Action corresponding to Application No. 201380023861.5; dated Mar. 1, 2016, with English translation.
Taiwan Office Action corresponding to Application No. 102137020; dated Apr. 21, 2017.

* cited by examiner

POWER RECEIVING CIRCUIT, CONTROL METHOD FOR WIRELESS POWER RECEIVING APPARATUS, AND ELECTRONIC DEVICE

CROSS REFERENCE TO RELATED APPLICATIONS

This application is a continuation under 35 U.S.C. § 120 of PCT/JP2013/006057, filed Oct. 10, 2013, which is incorporated herein by reference and which claimed priority under 35 U.S.C. § 119 to Japanese Application No. 2012-229112, filed Oct. 16, 2012, the entire content of which is also incorporated herein by reference.

BACKGROUND OF THE INVENTION

Field of the Invention

The present invention relates to a wireless power supply technique.

Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

With a wireless power supply system that conforms to the Qi standard, electric power to be supplied can be controlled by means of communication between a wireless power receiving apparatus (receiver) and a wireless power supply apparatus (transmitter). It is conceivable that systems configured to control electric power to be supplied according to an instruction received from a power receiving apparatus will become widespread in the future, without being confined to the Qi standard.

Wireless power receiving apparatuses according to current techniques are designed with a principal objective of stably supplying power to a secondary battery. This can lead to a problem of reduced power supply efficiency or a problem of increased temperature, depending on the operation environment and platform of the wireless power receiving apparatus.

SUMMARY OF THE INVENTION

The present invention has been made in view of such a situation. Accordingly, it is an exemplary purpose of an embodiment of the present invention to provide a wireless power receiving apparatus which provides improved power supply efficiency and/or suppression of temperature increase.

An embodiment of the present invention relates to a power receiving control circuit that receives an AC coil current from a reception coil, and that supplies a stabilized DC output voltage to a charging circuit that charges a secondary battery. The power receiving control circuit comprises: a rectifier circuit that rectifies the coil current; a smoothing capacitor connected to the output of the rectifier circuit; a regulator that receives a rectified voltage across the smoothing capacitor, and that generates the output voltage that is stabilized to a predetermined target level; and a controller having a predetermined relation between a value of the charging current supplied to the secondary battery and a target value of the rectified voltage, that detects the value of the charging current, and that transmits, to the wireless power supply apparatus, information that indicates electric power to be transmitted from the wireless power supply apparatus, according to a detection value of the charging current with reference to the aforementioned relation. The controller is configured to be capable of changing the relation between the detection value of the charging current and the target value of the rectified voltage.

The "detection value of the charging current" may be an actual measurement value of the charging current. Also, in a case in which constant-current charging is performed, the "detection value of the charging current" may be an instruction value which indicates the charging current.

The power consumption of the power receiving control circuit corresponds to the product of the detection value of the charging current and the rectified voltage across the smoothing capacitor. Thus, by controlling the target value of the rectified voltage according to the detection value of the charging current, such an arrangement is capable of stabilizing the supplied electric power.

In addition, by configuring such an arrangement to be capable of changing the relation between the value of the charging current supplied to the secondary battery and the target value of the rectified voltage, and by selecting a suitable relation according to the state of the wireless power receiving apparatus, such an arrangement provides high efficiency regardless of the use environment of the power receiving control circuit, the platform, and the like. Also, such an arrangement is capable of suppressing an increase in the temperature.

Also, the controller may change the relation between the detection value of the charging current and the target value of the rectified voltage according to the temperature.

By reducing the charging current when the temperature increases, such an arrangement is capable of reducing power consumption of the charging circuit, thereby suppressing additional heat generation in the charging circuit. However, in this state, in a case in which the power receiving control circuit controls the rectified voltage according to the same relation regardless of the temperature, this leads to increased rectified voltage according to a reduction in the charging current. Thus, the power consumption is not reduced in the power receiving control circuit, leading to a problem in that the heat generation cannot be suppressed in the power receiving control circuit. In order to solve such a problem, by changing the relation between the charging current and the rectified voltage according to the temperature, such an arrangement is capable of suppressing an increase in the rectified voltage when the charging current drops. Thus, such an arrangement is capable of suppressing an increase in the temperature.

Also, the controller may reduce a product of the detection value of the charging current and the target value of the rectified voltage according to an increase in the temperature in a range in which the charging current is relatively small.

Also, the controller may change the relation between the detection value of the charging current and the target value of the rectified voltage based on the comparison result between the temperature and a predetermined threshold value.

Also, the controller may change the relation between the detection value of the charging current and the target value of the rectified voltage according to an external control signal in addition to the temperature.

Also, the regulator may be configured to allow setting of the target level of its output voltage from an external circuit.

Also, the control signal may be configured to set the target level of the output voltage of the regulator.

The power consumption of the linear regulator is proportional to the difference between the rectified voltage, which is the input voltage of the linear regulator, and the output voltage thereof. With such an embodiment, the voltage level of the rectified voltage can be suitably set according to the target value of the output voltage. Thus, such an arrangement is capable of reducing unnecessary power consumption of the linear regulator, thereby providing improved efficiency.

Also, the controller may switch the relation between the detection value of the charging current and the target value of the rectified voltage according to an external control signal.

Also, the regulator may be configured to allow setting of the target level of its output voltage from an external circuit. Also, the control signal may be configured to set the target level of the output voltage of the regulator. Such an arrangement is capable of reducing unnecessary power consumption of the linear regulator.

Also, the control signal may be a signal which indicates the temperature. Such an arrangement is capable of suppressing an increase in the temperature.

Also, the relation may be determined such that, as the detection value of the charging current becomes smaller, the target value of the rectified voltage becomes greater. Such an arrangement is capable of controlling the supplied electric power such that it is maintained at a constant level.

Also, the power receiving control circuit according to an embodiment may conform to the Qi standard.

Also, the power receiving control circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

By monolithically integrating the circuit as a single IC, such an arrangement allows the circuit area to be reduced, and allows the circuit elements to have uniform characteristics.

Another embodiment of the present invention relates to an electronic device. The electronic device may include any one of the aforementioned power receiving control circuits.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

[Comparison Technique]

In order to clarify the problem of the wireless power supply system, first, description will be made regarding a comparison technique investigated beforehand by the present inventors.

Figure 1:
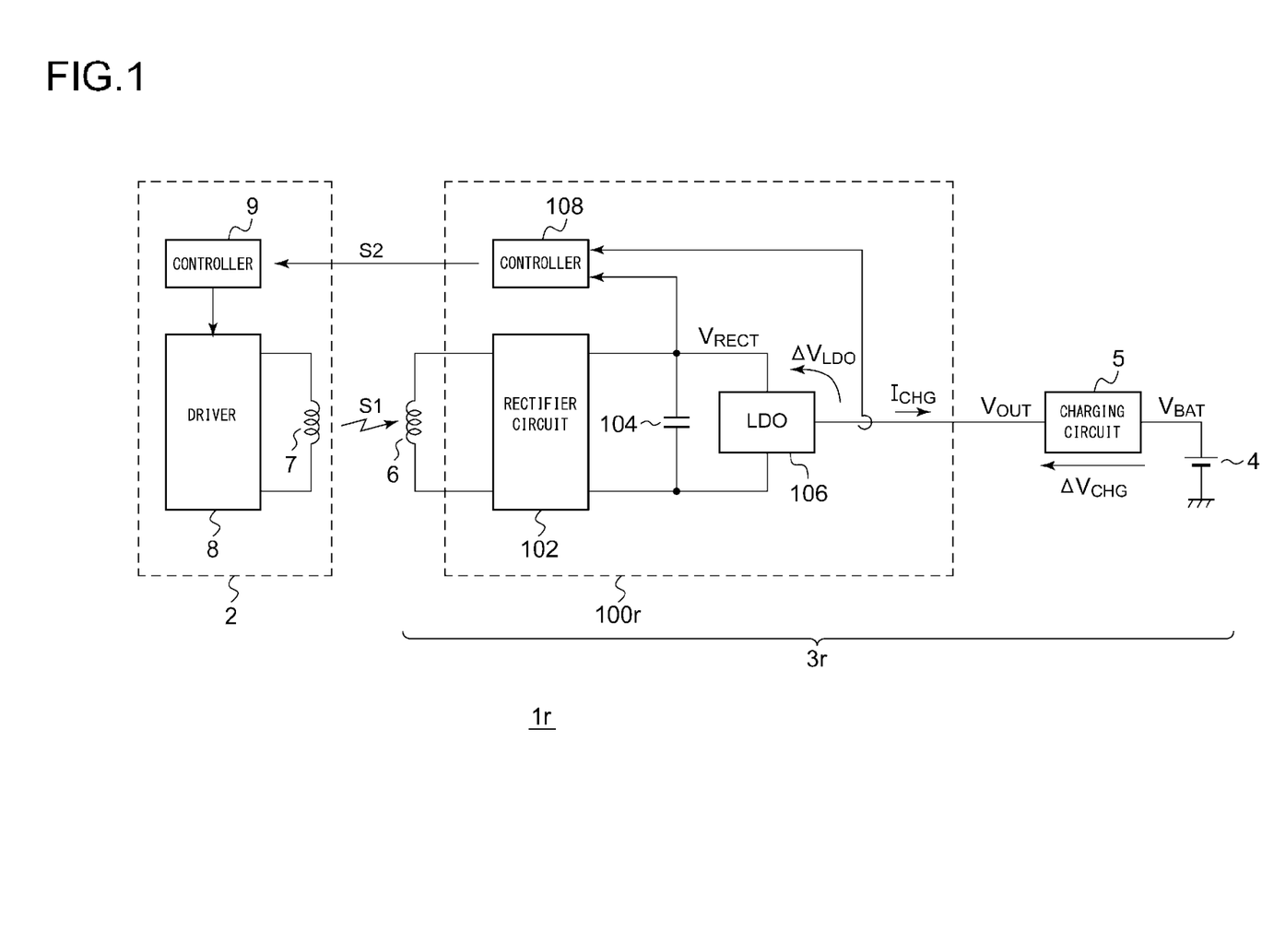
FIG. 1 is a circuit diagram showing a wireless power supply system according to a comparison technique.

FIG. 1 is a circuit diagram showing a wireless power supply system according to a comparison technique. A wireless power supply system 1r includes a wireless power supply apparatus 2 and a wireless power receiving apparatus 3r.

The wireless power supply apparatus 2 includes a transmission coil 7, a driver 8, and a controller 9. The driver 8 instructs the transmission coil 7 to generate an AC coil current $I_{TX}$. The transmission coil 7 transmits an electric power signal S1 that corresponds to the coil current $I_{TX}$.

With the wireless power supply system 1r, electric power transmitted from the wireless power supply apparatus 2 can be controlled according to a control instruction received from the wireless power receiving apparatus 3. As an example of such a system, a power supply system that conforms to the Qi standard is known. However, the present invention is not restricted to such an arrangement.

The controller 9 controls the driver 8 according to an instruction signal S2 received from the wireless power receiving apparatus 3r as described later. Such an arrangement adjusts the amplitude of the current $I_{TX}$ that flows through the transmission coil 7, thereby adjusting the magnitude of the electric power signal S1, i.e., adjusting the supply of electric power.

The wireless power receiving apparatus 3r includes a secondary battery 4, a charging circuit 5, a reception coil 6, and a power receiving control circuit 100r.

The reception coil 6 receives the electric power signal S1 from the transmission coil 7 of the wireless power supply apparatus 2, and generates an AC coil current $I_{RX}$ that corresponds to the electric power signal S1. The power receiving control circuit 100r receives the coil current $I_{RX}$, rectifies the coil current $I_{RX}$ thus received, and generates a DC output voltage $V_{OUT}$ which is stabilized to a predetermined level. The power receiving control circuit 100r includes a rectifier circuit 102, a smoothing capacitor 104, a linear regulator (LDO: Low Drop Output) 106, and a controller 108. The rectifier circuit 102, the linear regulator 106, and the controller 108 are integrated on a single semiconductor substrate as a function IC (Integrated Circuit). The smoothing capacitor 104 is provided as an external component of the function IC.

The rectifier circuit 102 rectifies the coil current $I_{RX}$. The rectifier circuit 102 may be configured as a diode-bridge circuit or an H-bridge circuit. The smoothing capacitor 104 is connected to the output of the rectifier circuit 102. The smoothing capacitor 104 smoothes the output voltage of the rectifier circuit 102. The linear regulator 106 receives a DC voltage (which will also be referred to as the "rectified voltage") $V_{RECT}$ that occurs across the smoothing capacitor 104, and generates the output voltage $V_{OUT}$ which is stabilized to a predetermined target level.

The controller 108 generates, for the controller 9 of the wireless power supply apparatus 2, the control instruction S2 which indicates the electric power to be transmitted from the wireless power supply apparatus 2. Specifically, the controller 108 is provided with a relation (which will also be referred to as the "control characteristics") between the detection value of the charging current $I_{CHG}$ supplied to the secondary battery 4 and the target value of the rectified voltage $V_{RECT}$. The control characteristics may be prepared in the form of a table, or may be prepared in the form of a relation expression. That is to say, the form of the control characteristics is not restricted in particular.

Figure 2:
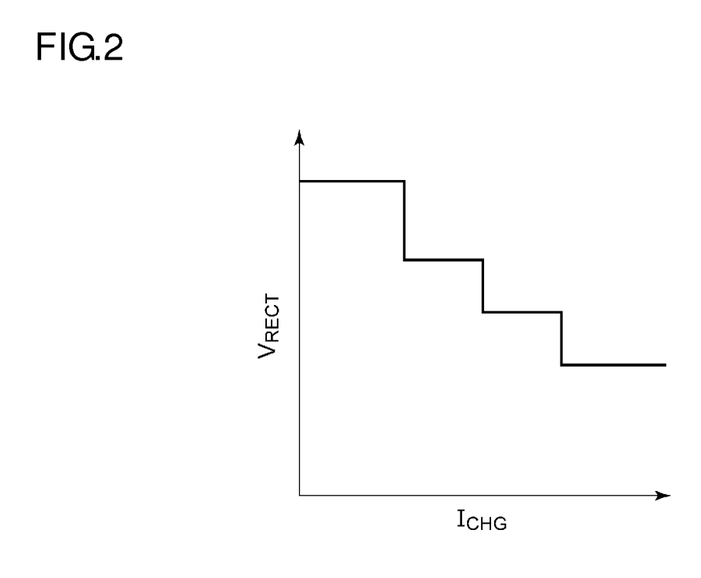
FIG. 2 is a diagram showing an example of the relation (control characteristics) between the value of the charging current and the target value of the rectified voltage.

FIG. 2 is a diagram showing an example of the relation (control characteristics) between the value of the charging current $I_{CHG}$ and the target value of the rectified voltage $V_{RECT}$. Assuming that the smoothing capacitor 104 functions as a power supply, the sum total of electric power supplied to the linear regulator 106, the charging circuit 5, and the secondary battery 4, which function as a load of the smoothing capacitor 104, is represented by the product of the rectified voltage $V_{RECT}$ and the charging current $I_{CHG}$. The target value of the rectified voltage $V_{RECT}$ is raised according a reduction in the detection value of the charging current $I_{CHG}$.

The above is the configuration of the wireless power supply system 1r. Next, description will be made regarding the problems of the wireless power supply system 1r.

[Problem 1]

The wireless power supply system 1r supplies a large amount of electric power. Accordingly, without any countermeasures, such an arrangement has a problem of an increased temperature of the wireless power receiving apparatus 3r. In order to reduce the temperature of the wireless power receiving apparatus 3r, there is a need to reduce the power consumption of the power receiving control circuit 100r and the power consumption of the charging circuit 5.

The power consumption $P_{CHG}$ of the charging circuit 5 is represented by the product of the voltage drop $\Delta V_{CHG}$ that occurs at the charging circuit 5 and the charging current $I_{CHG}$, i.e., is represented by $P_{CHG}=\Delta V_{CHG} \times I_{CHG}$. The output voltage $V_{OUT}$, which is the input voltage of the charging circuit 5, is maintained at a constant level. Furthermore, the battery voltage $V_{BAT}$, which is the output voltage of the charging circuit 5, exhibits an approximately constant value. Thus, the voltage drop $\Delta V_{CHG}$ can be assumed to be constant. That is to say, by reducing the charging current $I_{CHG}$ according to an increase in the temperature, the power consumption $P_{CHG}$ of the charging circuit 5 can be reduced.

The power consumption $P_{LDO}$ of the linear regulator 106 is represented by the product of the voltage drop $\Delta V_{LDO}$ that occurs at the linear regulator 106 and the charging current $I_{CHG}$, i.e., is represented by $P_{LDO}=\Delta V_{LDO} \times I_{CHG}$. With such an arrangement, if the charging current $I_{CHG}$ is reduced according to an increase in the temperature, the rectified voltage $V_{RECT}$ rises according to the control characteristics shown in FIG. 2. A rise of the rectified voltage $V_{RECT}$ means a rise of the voltage drop $\Delta V_{LDO}$ that occurs at the linear regulator 106. Thus, a reduction in the charging current $I_{CHG}$ has only a small effect on a reduction in the power consumption $P_{LDO}$ of the linear regulator 106. Thus, such an arrangement is not capable of suppressing an increase in the temperature of the power receiving control circuit 100r.

[Problem 2]

Various kinds of secondary batteries 4 or various kinds of charging circuits 5 are employed depending on the platform on which the power receiving control circuit 100r is used. For example, let us consider a case in which the secondary battery 4 is configured as a lithium ion battery with a nominal voltage of 3.7 V. The charging circuit 5 used on a given platform (which will be referred to as the "first platform") requires an input voltage $V_{OUT}$ of 5 V or more to charge the lithium ion battery 4. On the other hand, the charging circuit 5 used on another platform (which will be referred to as the "second platform") requires an input voltage $V_{OUT}$ of 4.5 V. In this case, in order to allow the power receiving control circuit 100r to be used on both platforms, there is a need to set the target level of the output voltage $V_{OUT}$ to 5 V.

In a case in which the power receiving control circuit 100r designed to output the output voltage $V_{OUT}$ of 5 V is used on the second platform, this leads to unnecessary power loss in the charging circuit 5.

Description will be made below regarding a power receiving control circuit according to an embodiment configured to resolve at least one problem that occurs in the comparison techniques.

First Embodiment

Figure 3:
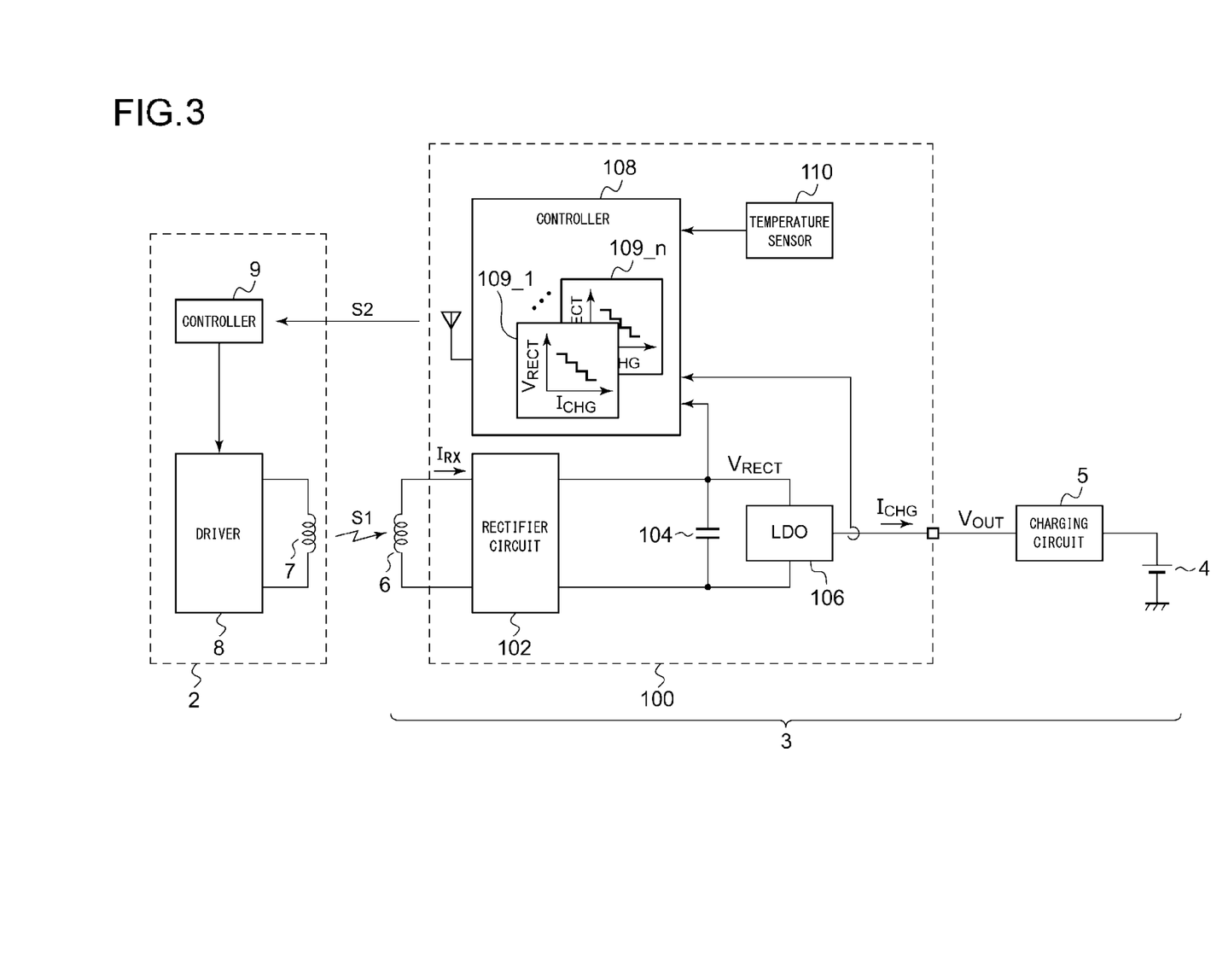
FIG. 3 is a circuit diagram showing a configuration of a power receiving control circuit according to a first embodiment.

FIG. 3 is a circuit diagram showing a configuration of a power receiving control circuit 100 according to a first embodiment. In the present embodiment, the controller 108 is configured to be capable of changing the control characteristics 109, configured as a relation between the detection value of the charging current $I_{CHG}$ and the target value of the rectified voltage $V_{RECT}$. For example, the controller 108 is configured to be capable of selecting the control characteristics from among multiple control characteristics 109_1 through 109_n. The controller 108 changes the control characteristics 109 to be used according to the platform on which the power receiving control circuit 100 is used and the present state of the overall operation of the wireless power receiving apparatus 3.

The power receiving control circuit 100 includes a temperature sensor 110. The temperature sensor 110 detects the temperature of the power receiving control circuit 100. The controller 108 changes the control characteristics 109 according to the temperature thus detected. It should be noted that the power receiving control circuit 100 may receive data that indicates the temperature from an external microcomputer instead of including the temperature sensor 110.

Figure 4A:
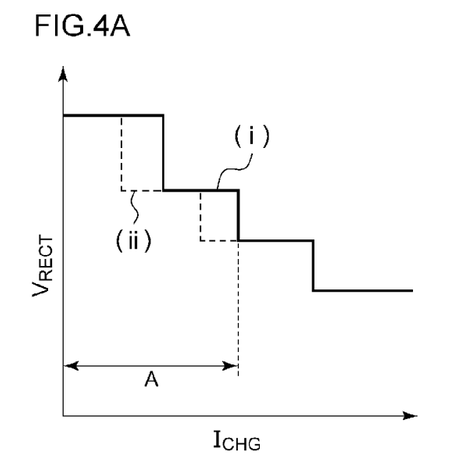
FIGS. 4A through 4C are diagrams each showing the temperature dependence of the control characteristics according to the first embodiment.
Figure 4B:
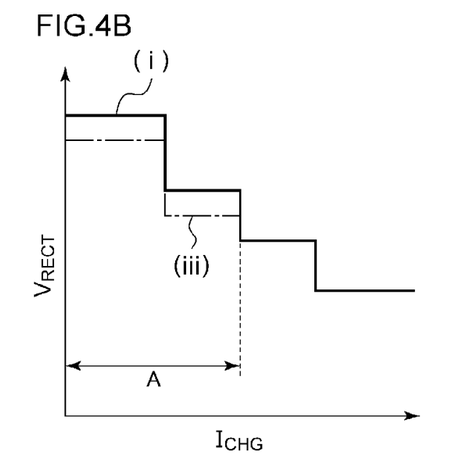
Figure 4C:
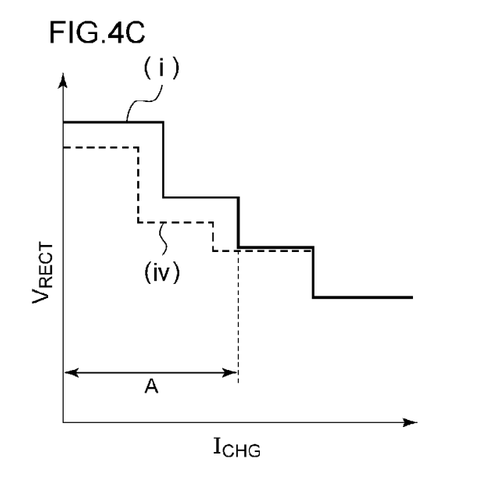

FIGS. 4A through 4C are diagrams each showing the temperature dependence of the control characteristics in the first embodiment.

As shown in FIG. 4A, in the normal temperature range, the low-temperature control characteristics (i) as represented by the solid line are selected. On the other hand, in a state in which the temperature is relatively high, the high-temperature control characteristics (ii) as represented by the broken line shown in FIG. 4A are selected. The high-temperature control characteristics are designed such that the product of the charging current $I_{CHG}$ and the rectified voltage $V_{RECT}$, i.e., the supplied electric power, becomes small in a range A in which the charging current $I_{CHG}$ is relatively small, as compared with the low-temperature control characteristics (i). In other words, from another viewpoint, in the range A in which the charging current $I_{CHG}$ is relatively small, the target value of the rectified voltage $V_{RECT}$ is reduced as compared with the low-temperature control characteristics with respect to the same detection value of the charging current $I_{CHG}$.

For example, the controller 108 may compare the temperature with a predetermined threshold value, and may change the control characteristics based on the comparison result. FIG. 4A shows a case in which the control characteristics are switched between two control characteristics. Also, the controller 108 may switch the control characteristics between three or more control characteristics.

FIGS. 4B and 4C show different high-temperature control characteristics (iii) and (iv). Such high-temperature control characteristics (iii) and (iv) are each determined such that the product of the charging current $I_{CHG}$ and the rectified voltage $V_{RECT}$ becomes small in the range A in which the charging current $I_{CHG}$ is relatively small, as compared with the low-temperature control characteristics (i).

The above is the configuration of the power receiving control circuit 100 according to the first embodiment. Next, description will be made regarding the operation thereof.

In a state in which the temperature is relatively low, the low-temperature control characteristics are selected. In this state, the electric power supplied from the wireless power transmitting apparatus 2 is maintained at a constant level regardless of the charging current $I_{CHG}$.

When the temperature becomes high, in order to suppress an additional rise of the temperature, the charging circuit 5 reduces the charging current $I_{CHG}$. Furthermore, in a state in which the temperature is relatively high, the controller 108 selects the high-temperature control characteristics, thereby reducing the supplied electric power as compared with a state in which the low-temperature control characteristics are selected.

The above is the operation of the power receiving control circuit 100.

With the power receiving control circuit 100, when the temperature becomes high, the charging current $I_{CHG}$ is reduced, thereby reducing the power consumption of the charging circuit 5. In addition, the electric power supplied from the wireless power receiving apparatus 2 is reduced. Thus, such an arrangement allows the power consumption of the linear regulator 106 to be reduced. That is to say, such an arrangement is capable of reducing the power consumption of both the linear regulator 106 and the charging circuit 5, thereby suppressing heat generation. Thus, such an arrangement resolves the aforementioned problem 1.

Second Embodiment

Figure 5:
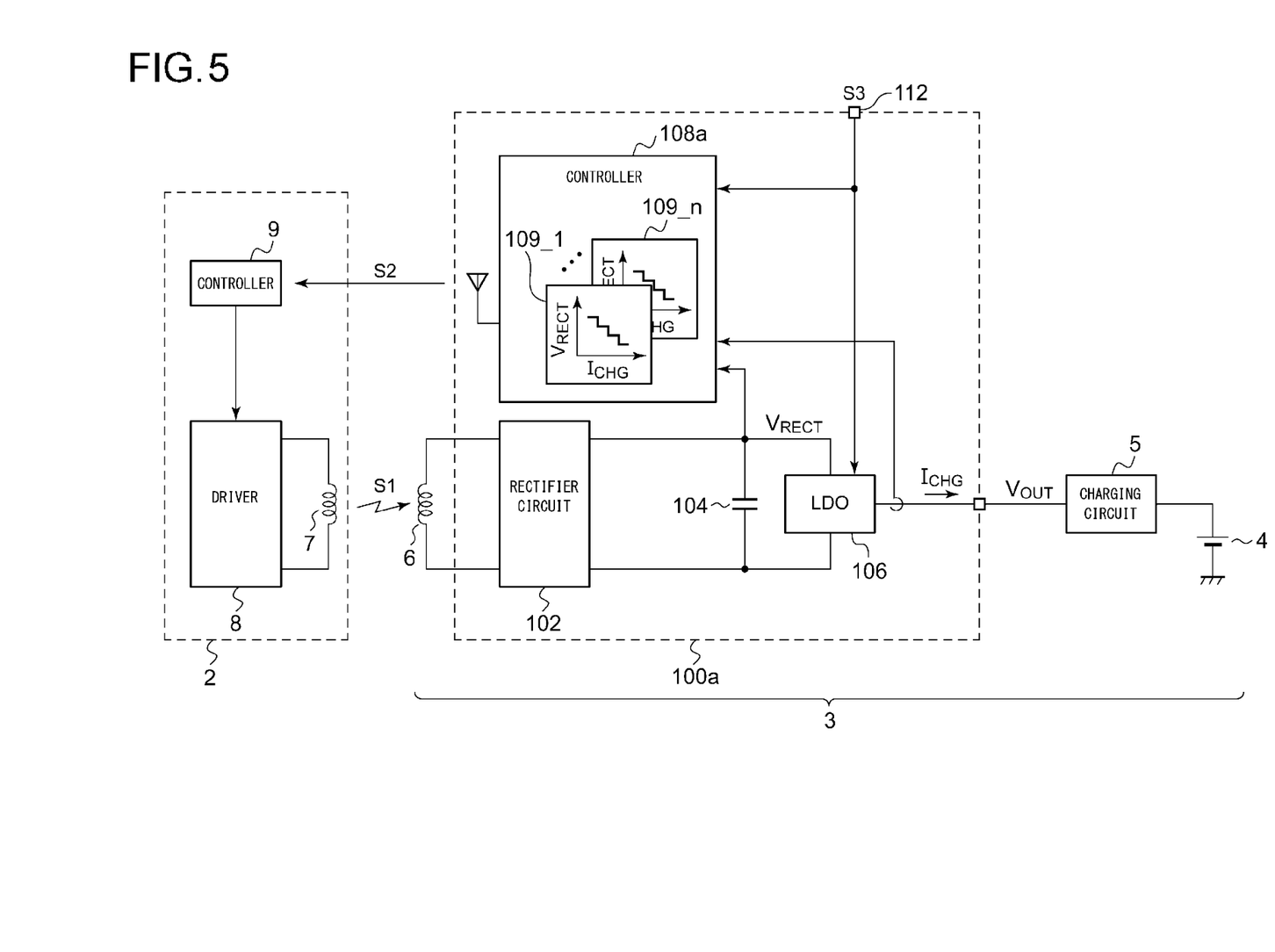
FIG. 5 is a circuit diagram showing a configuration of a power receiving control circuit according to a second embodiment.

FIG. 5 is a circuit diagram showing a configuration of a power receiving control circuit 100a according to a second embodiment.

In the second embodiment, a controller 108a is configured to switch the control characteristics in the same manner as in the first embodiment. The power receiving control circuit 100a includes a control terminal 112 instead of the temperature sensor 110. The control terminal 112 receives an external control signal S3 as an input signal.

The controller 108a switches the control characteristics according to the control signal S3. This allows an external circuit of the wireless power receiving apparatus 3 to select and set the control characteristics suitable for the platform on which the power receiving control circuit 100a is operated.

Preferably, a regulator 106a is configured to be capable of setting the target level of the output voltage $V_{OUT}$ according to the control signal S3 received from an external circuit. With such an arrangement, the controller 108 selects the control characteristics according to the control signal S3 in order to set the output voltage $V_{OUT}$.

Figure 6:
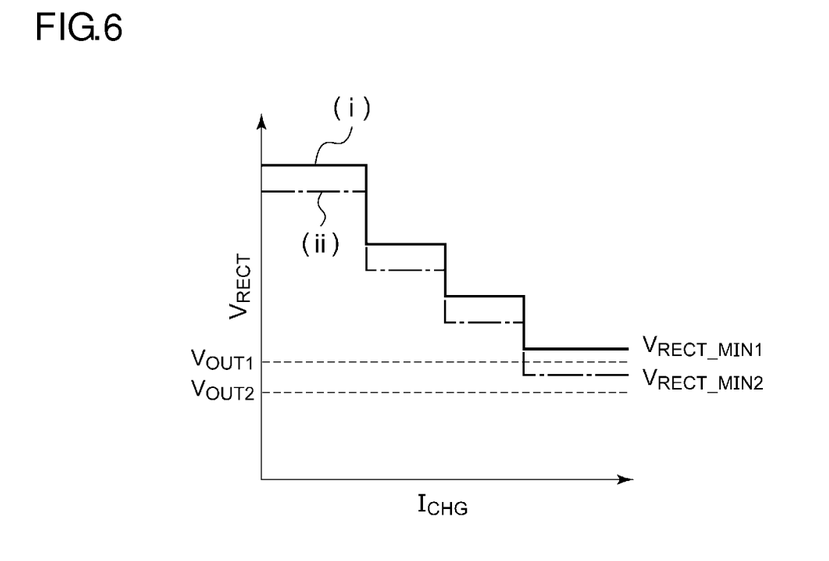
FIG. 6 is a diagram showing the output voltage dependence of the control characteristics according to the second embodiment.

FIG. 6 is a diagram showing the output voltage dependence of the control characteristics according to the second embodiment. For example, the output voltage $V_{OUT}$ of the linear regulator 106 is configured such that it can be switched between N (N represents an integer of 2 or more) levels according to the value of the control signal S3. The controller 108a is configured to be capable of selecting one from among N control characteristics designed for respective output voltage levels $V_{OUT}$.

For simplification of description, description will be made regarding an arrangement in which N=2. When the target value of the output voltage $V_{OUT}$ is set to a first value $V_{OUT1}$, the first control characteristics (i) represented by the solid line are selected. On the other hand, when the target value of the output voltage $V_{OUT}$ is set to a second value $V_{OUT2}$ which is lower than the first value $V_{OUT1}$, the second control characteristics (ii) represented by the broken line are selected.

In the present embodiment, the minimum values $V_{RECT\_MIN1}$ and $V_{RECT\_MIN2}$ of the rectified voltage $V_{RECT}$, which are respectively set in the control characteristics (i) and (ii), are respectively determined according to the setting values $V_{OUT1}$ and $V_{OUT2}$ of the output voltage $V_{OUT}$.

More specifically, the minimum value $V_{RECT\_MIN}$ of the rectified voltage $V_{RECT}$ is set for the setting value $V_{OUTX}$ of the output voltage $V_{OUT}$ such that $V_{RECT\_MIN}$ is approximately equal to $(V_{OUTX}+I_{CHG\_MAX} \times R_{ON})$. Here, $R_{ON}$ represents the on-resistance of the linear regulator 106, and $I_{CHG\_MAX}$ represents an assumed maximum charging current.

Furthermore, for voltage levels other than the minimum value $V_{RECT\_MIN}$, the first control characteristics (i) are similarly configured to have higher voltage levels than those of the second control characteristics (ii).

The above is the configuration of the power receiving control circuit 100a. Next, description will be made regarding the advantages thereof.

As described with reference to the comparison technique, the optimum value of the input voltage $V_{OUT}$ of the charging circuit 5 varies depending on the platform on which the wireless power receiving apparatus 3 is mounted. With the second embodiment, the charging circuit 5 is supplied with the optimum voltage $V_{OUT}$ for each platform. Thus, such an arrangement is capable of reducing unnecessary power loss in the charging circuit 5.

In addition, the controller 108a is capable of changing the control characteristics, i.e., the target value of the rectified voltage $V_{RECT}$, according to the control signal S3, i.e., the setting value of the output voltage $V_{OUT}$. That is to say, in a case of employing a platform that requires the low output voltage $V_{OUT}$, such an arrangement is capable of reducing the voltage level of the rectified voltage $V_{RECT}$ according to such a low output voltage $V_{OUT}$. This allows unnecessary power loss to be reduced in the linear regulator 106. That is to say, such an arrangement resolves the aforementioned problem 2.

Third Embodiment

A third embodiment is configured as a combination of the first embodiment and the second embodiment. That is to say, the controller 108 changes the control characteristics according to an external instruction, in addition to the temperature. Such an arrangement resolves both the problems 1 and 2.

Lastly, description will be made regarding an electronic device employing the wireless power receiving apparatus 3 according to any one of the first through third embodiments.

Figure 7:
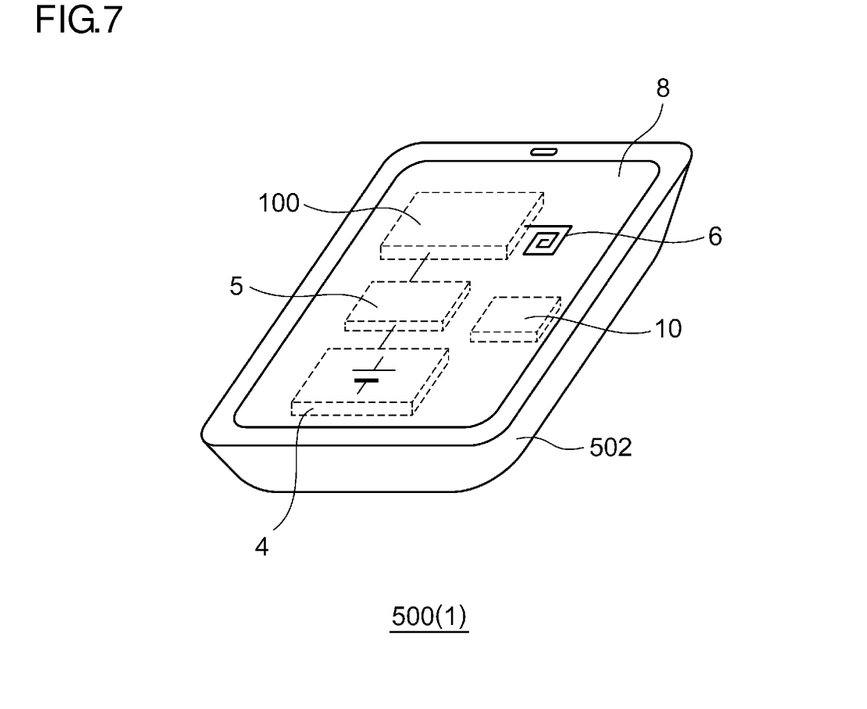
FIG. 7 is a diagram showing an example of an electronic device.

FIG. 7 is a diagram showing an example of such an electronic device. An electronic device 500 shown in FIG. 7 is configured as a tablet PC, a portable game machine, or a portable audio player. The electronic device 500 includes the secondary battery 4, the charging circuit 5, the reception coil 6, and the power receiving control circuit 100, which are built into a casing 502. A microcontroller 10 is configured as a host processor that controls the overall operation of the electronic device 500. The microcontroller 10 operates receiving electric power from the secondary battery 4.

Description has been made regarding the present invention with reference to the first through third embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiments regarding an arrangement in which the control characteristics are switched according to the temperature or a control signal for setting the output voltage. However, the present invention is not restricted to such an arrangement. Also, the control characteristics may be switched according to another state of the power receiving control circuit 100 or the wireless power receiving apparatus 3. For example, the control characteristics may be switched according to the remaining capacity of the wireless power supply apparatus 2, the continuous charging time by means of the charging circuit, or the like. Such a modification also provides advantages of improved efficiency and/or suppression of temperature increase.

Description has been made in the embodiments regarding a power receiving apparatus that conforms to the Qi standard. However, the present invention is not restricted to such an arrangement. Also, the present invention is applicable to a power receiving apparatus that conforms to a standard which will be developed in the future.

While the preferred embodiments of the present invention have been described using specific terms, such description is for illustrative purposes only, and it is to be understood that changes and variations may be made without departing from the spirit or scope of the appended claims.

What is claimed is:

1. A power receiving control circuit structured to receive an AC coil current from a reception coil, and to supply a stabilized DC output voltage to a charging circuit structured to charge a secondary battery, the power receiving control circuit comprising:
   a rectifier circuit structured to rectify the coil current;
   a smoothing capacitor connected to an output of the rectifier circuit;
   a regulator structured to receive a rectified voltage across the smoothing capacitor, to generate the output voltage that is stabilized to a predetermined target level, and to supply the output voltage to the charging circuit; and
   a controller having control characteristics which define a relation between a value of the charging current supplied to the secondary battery and a target value of the rectified voltage, structured to detect the value of the charging current, and to transmit, to the wireless power supply apparatus, information that indicates electric power to be transmitted from the wireless power supply apparatus, according to a detection value of the charging current with reference to the control characteristics,
   wherein the controller is configured to be capable of changing the control characteristics.

2. The power receiving control circuit according to claim 1, wherein the controller is structured to change the control characteristics according to a temperature.

3. The power receiving control circuit according to claim 2, wherein the controller is structured to reduce a product of the detection value of the charging current and the target value of the rectified voltage according to an increase in the temperature in a range in which the charging current is relatively small.

4. The power receiving control circuit according to claim 3, wherein the controller is structured to change the control characteristics based on a comparison result between the temperature and a predetermined threshold value.

5. The power receiving control circuit according to claim 2, wherein the controller is structured to change the control characteristics according to an external control signal in addition to the temperature.

6. The power receiving control circuit according to claim 5, wherein the regulator is configured to allow setting of the target level of its output voltage from an external circuit,
   and wherein the control signal is configured to set the target level of the output voltage of the regulator.

7. The power receiving control circuit according to claim 1, wherein the controller is structured to switch the control characteristics according to an external control signal.

8. The power receiving control circuit according to claim 7, wherein the regulator is configured to allow setting of the target level of its output voltage from an external circuit,
   and wherein the control signal is configured to set the target level of the output voltage of the regulator.

9. The power receiving control circuit according to claim 1, wherein the control characteristics are determined such that, as the detection value of the charging current becomes smaller, the target value of the rectified voltage becomes greater.

10. The power receiving control circuit according to claim 1, that conforms to a Qi standard.

11. An electronic device comprising the power receiving control circuit according to claim 1.

12. A control method for a wireless power receiving apparatus, wherein the wireless power receiving apparatus comprises:
- a reception coil;
- a rectifier circuit structured to rectify a current that flows through the reception coil;
- a smoothing capacitor connected to an output of the rectifier circuit;
- a regulator is structured to receive a rectified voltage across the smoothing capacitor, and to generate an output voltage that is stabilized to a predetermined target level; and
- a charging circuit structured to receive the output voltage of the regulator, and to charge a secondary battery, wherein the control method comprises:
- determining control characteristics which define a relation between a value of a charging current supplied to the secondary battery and a target value of the rectified voltage according to a state of the wireless power receiving apparatus;
- detecting the value of the charging current supplied to the secondary battery; and
- transmitting, to a wireless power supply apparatus, information which indicates electric power to be transmitted from the wireless power supply apparatus, according to a detection value of the charging current based on the control characteristics.

13. The control method according to claim 12, wherein a temperature is employed as the state of the wireless power receiving apparatus.

14. The control method according to claim 13, wherein a product of the detection value of the charging current and the target value of the rectified voltage is reduced according to an increase in the temperature in a range in which the charging current is relatively small.

15. The control method according to claim 13, wherein the state of the wireless power receiving apparatus includes an external control signal in addition to the temperature.

16. The control method according to claim 15, wherein the regulator is configured to allow setting of the target level of its output voltage from an external circuit,
and wherein the control signal is configured to set the target level of the output voltage of the regulator.

17. The control method according to claim 12, wherein the state of the wireless power receiving apparatus includes an external control signal.

18. The control method according to claim 17, wherein the regulator is configured to allow setting of the target level of its output voltage from an external circuit,
and wherein the control signal is configured to set the target level of the output voltage of the regulator.

19. The control method according to claim 12, wherein the control characteristics are determined such that, as the detection value of the charging current becomes smaller, the target value of the rectified voltage becomes greater.

* * * * *